Patented June 2, 1936

UNITED STATES PATENT OFFICE 2,042,923

PLASTIC COMPOSITIONS AND ARTICLES MADE THEREFROM

Arthur E. Brooks, Nutley, N. J., assignor to United States Rubber Products, Inc., New York, N. Y., a corporation of Delaware No Drawing. Application August 2, 1935, Serial No. 34,325

8 Claims. (Cl. 106—22)

This invention relates to plastic compositions and more particularly to plastic compositions containing olefin polysulphide plastics.

Olefin polysulphide plastic compositions have been used where a higher solvent resistance than can be obtained with rubber compositions is desired. These olefin polysulphide plastics, so-called, are well known organic polysulphides derived by the reaction of polysulphides upon methylene bodies, such as methylene dihalides or formaldehyde, or other olefin bodies, particularly dihalides, such as the dihalides of ethylene, propylene, butylene, and the like, and have generally the empirical formula $C_nH_{2n}S_x$. These olefin polysulphide plastics may be compounded with various materials to modify their properties while handling or fabricating and also to modify the properties of the product after so-called curing with heat in the presence of curing agents to a state resembling vulcanized rubber. It has been found necessary in order to handle many of these olefin polysulphide plastics satisfactorily on the mill to incorporate therein varying proportions of rubber, the plastic often being crumbly if not mixed with rubber. Rubber is also added to give higher stretch compounds. Zinc oxide is generally added as a curing agent in order to permit curing to a state resembling vulcanized rubber after molding, calendering, tubing, or other fabricating operations. Various known softening and plasticizing agents for olefin polysulphide plastics may be included, and carbon black may be added to increase the strength of the product. The addition of rubber to permit these olefin polysulphide plastics to be properly broken down and compounded on the mill and to produce higher stretch compounds reduces considerably the resistance to solvents such as gasoline and oils and thereby to a considerable extent decreases those special characteristics desired in the material.

One object of the present invention is to compound olefin polysulphide plastics with a material that will enhance the milling properties of the plastic in a manner similar to rubber and yet not decrease the resistance of the plastic to solvents such as gasoline and oils.

Another object of the invention is to compound olefin polysulphide plastics to produce compounds having higher breaking elongations without reducing the solvent resistance in order to permit higher loadings of the compounds with carbon black to produce increased strength of product.

A further object of the invention is to produce higher stretch olefin polysulphide plastic compounds in which the resistance to swelling in gasoline and oils is as high as in compounds containing little or no rubber.

Other objects and advantages will be apparent from the following description.

In carrying out the present invention, there is mixed with the olefin plastic polymer a plastic, elastic reaction product of one molar proportion of an aromatic compound having the general formula $R—C_6H_4—R'$, wherein R and R' each represent hydrogen or a saturated aliphatic hydrocarbon radical containing more than one carbon atom, with about one to three molar proportions of ethylene chloride, which may be prepared as described in the co-pending application Serial No. 685,739 of Seaphes D. Shinkle filed Aug. 18, 1933, now Patent 2,016,026 granted October 1, 1935. The preparation of this plastic, elastic reaction product is described in detail in the referred to Shinkle application, and there is quoted below sufficient disclosure from that application to aid in preparing the product.

"In preparing these new products, one mol of an aromatic compound having the general formula $R—C_6H_4—R'$, wherein R and R' each represent hydrogen or a saturated aliphatic hydrocarbon radical containing more than one carbon atom, examples of which are benzene, ethyl benzene, diethyl benzene, isopropyl benzene (cumene), butyl benzene is treated with one to three mols of an ethylene dihalide (symmetrical) in the presence of aluminum chloride or its equivalent, and the reaction allowed to proceed until gellation occurs, and thereafter the reaction is stopped and the product recovered. When an aromatic hydrocarbon of the class described is treated with an ethylene dihalide, such as ethylene chloride, in the presence of a small amount of aluminum chloride, a smooth reaction takes place with the evolution of hydrogen chloride during which there is a marked increase in the viscosity of the reaction mixture. When the reaction has proceeded to a certain point, the entire liquid reaction mixture swells to several times its original volume and is converted into a jelly-like mass. The reaction may thereafter be stopped and the product substantially freed from aluminum salts, by treating or washing the mass with water, preferably containing a small amount of acid such as hydrochloric acid or alkali such as sodium hydroxide, and finally with water. In order to facilitate the washing operation, the jelly may be disintegrated by mechanical and/or by other means. I have found that the addition to the reaction mixture just prior to the washing treatment of a small quantity of an organic solvent, such as butylacetate, together with a mechanical disintegration, effects rapidly the breaking up of the gel structure and produces a mass of finely divided jelly-like particles. I may, if desired, pass steam through the mixture during the washing operation, thereby effecting the removal of any unreacted hydrocarbon or ethylene dihalide. The resulting product is a spongy mass of elastic particles, which may be separated from the water and dried. Drying may be effected by heating at an elevated temperature, for example at 70° to 100° C., under vacuum, if desired, thereby removing residual water, volatile hydrocarbon and ethylene dihalide, or the product may first be partially dried by squeezing as by passing the material repeatedly through the rolls of a rubber mill. When so milled the particles coalesce to form a smooth continuous sheet. When the products are heated in the presence of water as in the washing and steaming operations they become lighter in color; when they are worked on a cold mill the color remains unchanged. When the products are heated substantially in the absence of water as in hot air, or when worked on a hot mill at temperatures below about 200° C., the products become dark in color, but are otherwise unchanged by the heat."

The addition of the plastic elastic reaction product above described (which may hereinafter be referred to as "Shinkle plastic") to the olefin polysulphide plastic, produces a composition which has improved milling, tubing and calendering properties, and which is highly resistant to gasoline and oil absorption. As shown in the following Table I, the addition of higher loadings of "Shinkle plastic" to produce products having a higher elongation at break may be accomplished without loss in solvent resistance while similar higher loadings of rubber greatly decrease the solvent resistance while giving products with only slightly higher stretch properties than with the same proportions of "Shinkle plastic." As may readily be seen, these higher loadings of "Shinkle plastic" which result in combining in the product the features of higher breaking elongation and high solvent resistance, may be utilized for higher loadings of carbon black which are desirable for increasing the strength of the products.

*Table I*

| Compound | Example 1 | Example 2 | Example 3 |
|---|---|---|---|
| Olefin polysulphide plastic | 100 | 100 | 100 |
| Rubber | 5 | 20 | |
| Shinkle plastic | | | 20 |
| Diphenyl guanidine | 0.25 | 0.25 | 0.25 |
| Tetramethyl thiuram disulphide | 0.10 | 0.10 | 0.10 |
| Zinc oxide | 10 | 10 | 10 |
| Carbon black | 25 | 25 | 25 |
| Stearic acid | 0.5 | 0.5 | 0.5 |
| Tensile strength at break (lbs. per sq. in.). | | | |
| Cure 30′ at 40#. | 665 | 823 | 594 |
| Cure 60′ at 40#. | 762 | 861 | 694 |
| Cure 90′ at 40#. | 606 | 726 | 745 |
| Elongation at break (percent) | | | |
| Cure 30′ at 40#. | 290 | 470 | 390 |
| Cure 60′ at 40#. | 220 | 350 | 290 |
| Cure 90′ at 40#. | 150 | 210 | 240 |
| Gasoline absorption, 7 days' immersion at room temperature, cure 60′ at 40#. | | | |
| Percent weight gain | 0.0 | 11.6 | 0.0 |
| Percent volume gain | 0.2 | 25.8 | 0.0 |
| Absorption of light lubricating oil, 7 days' immersion at 158° F., cure 60′ at 40#. | | | |
| Percent weight gain | 2.4 | 13.9 | −0.3 |
| Percent volume gain | 1.2 | 29.5 | −0.4 |

*Note.*—The small loss in the oil test of Example 3 is due to the slight extraction of a small amount of soluble material from the Shinkle plastic under the described conditions of test.

It may be seen from the above table that where 20 parts of rubber are added per 100 parts of olefin polysulphide plastic, to gain a higher stretch or greater elongation at break which is desirable in many compounds and particularly where higher loadings of carbon black are desired for increasing the strength of the product, the resistance to gasoline and oil is seriously diminished. Where with 20 parts of rubber per 100 parts of olefin polysulphide plastic the elongation at break has increased approximately 1.5 times over a composition comprising 5 parts of rubber per 100 parts of olefin polysulphide plastic, there is a sufficiently high swelling in gasoline and oil to nullify claims of such olefin polysulphide plastic compositions for special consideration in meeting severe service requirements. On the other hand, 20 parts of "Shinkle plastic" per 100 parts of olefin polysulphide plastic, while perhaps not increasing the elongation at break quite as much as an equal amount of rubber, shows no decrease in the resistance of the product to oil and gasoline. Such products as those compounded with 20 parts of "Shingle plastic" per 100 parts of olefin polysulphide plastic feature a sufficiently higher breaking elongation without loss of solvent resistance to permit higher loadings of carbon black to obtain the desired strength of product.

As shown in the following table, "Shingle plastics", even at those lower loadings which are around the minimum for proper milling of many of the olefin polysulphide plastics show superior results to rubber loadings, especially with respect to deterioration in oil.

*Table II*

| Compound | Example 1 | Example 2 |
|---|---|---|
| Olefin polysulphide plastic | 100 | 100 |
| Rubber | 5 | |
| "Shinkle plastic" | | 5 |
| Tetramethyl thiuram disulphide | 0.25 | 0.25 |
| Zinc oxide | 10 | 10 |
| Carbon black | 50 | 50 |
| Stearic acid | 0.5 | 0.5 |
| Tensile strength at break (lbs. per sq. in.) | | |
| Cure 30′ at 40#. | 668 | 672 |
| Cure 50′ at 40#. | 736 | 744 |
| Elongation at break (percent): | | |
| Cure 30′ at 40#. | 240 | 280 |
| Cure 50′ at 40#. | 190 | 230 |
| Tensile strength, aged 7 days in gasoline at room temperature, lbs. per sq. in. | | |
| Cure 30′ at 40#. | 588 | 669 |
| Cure 50′ at 40#. | 723 | 717 |
| Tensile strength, aged 7 days in light oil at 158° F.: | | |
| Cure 30′ at 40#. | 366 | 510 |
| Cure 50′ at 40#. | 421 | 594 |

It may be clearly seen from the above table that the deterioration in oil which is shown by the loss in tensile strength is much greater with olefin polysulphide plastics containing as low as 5 parts of rubber per 100 parts of olefin polysulphide plastic than with similar compounds containing 5 parts of "Shinkle plastic" instead of the rubber as the modifying agent.

The compounds disclosed in the above tables are merely set forth as examples of olefin polysulfide plastic compositions and the cures, which were mold cured for the number of minutes and under the temperatures corresponding to the steam pressures above noted, are those recommended for this type of compound. The diphenyl guanidine in the above compounds is used as a plasticizer as is likewise the tetramethyl thiuram disulphide. This latter material also acts as a vulcanizing agent for any rubber that is present. The zinc oxide is added as a curing agent for the olefin polysulphide plastic and this material permits the curing of the plastic to a state resembling vulcanized rubber. The carbon black acts as a reinforcing agent to increase the strength of the product while the small amount of stearic acid is added to aid in molding where desired. Other compositions of olefin polysulphide plastics may be used and these may contain various compounding ingredients. The addition of "Shinkle plastic" to such various compositions improves the milling, calendering and tubing properties of the olefin polysulphide plastic without impairing the resistance of the compound to swelling and deterioration in solvents such as gasoline and oil. In these various compositions with various compounding ingredients, it is preferred that a major proportion of the composition be olefin polysulphide plastic while the "Shinkle plastic" and other compounding ingredients be in minor proportion. The preferred amounts of the "Shinkle plastic" per 100 parts of olefin polysulphide plastic range from 5 to 20 parts by weight. However, as much as 60 parts of "Shinkle plastic" per 100 parts of olefin polysulphide plastic may be used to produce products having specially desired properties. No particular consideration need be given to modifying materials for the "Shinkle plastic" component of the plastic compound, and the olefin polysulphide plastic may be compounded as desired.

Various modifications will occur to those skilled in the art, and it is not intended to limit the invention other than as set forth in the appended claims.

Having thus described my invention, what I claim and desire to protect by Letters Patent is:

1. A plastic composition comprising an olefin polysulphide plastic and a plastic, elastic reaction product of one molar proportion of an aromatic compound having the general formula R—C$_6$H$_4$—R', where R and R' each represent hydrogen or a saturated aliphatic hydrocarbon radical containing more than one carbon atom, with about one to three molar proportions of ethylene chloride.

2. A plastic composition comprising a major proportion of an olefin polysulphide plastic and a minor proportion of a plastic, elastic reaction product of one molar proportion of an aromatic compound having the general formula R—C$_6$H$_4$—R', where R and R' each represent hydrogen or a saturated aliphatic hydrocarbon radical containing more than one carbon atom, with about one to three molar proportions of ethylene chloride.

3. A plastic composition comprising an olefin polysulphide plastic and up to about 60 parts per 100 parts of said olefin polysulphide plastic by weight of a plastic, elastic reaction product of one molar proportion of an aromatic compound having the general formula R—C$_6$H$_4$—R', where R and R' each represent hydrogen or a saturated aliphatic hydrocarbon radical containing more than one carbon atom, with about one to three molar proportions of ethylene chloride.

4. A plastic composition comprising an olefin polysulphide plastic and about 5 to 20 parts per 100 parts of said olefin polysulphide plastic by weight of a plastic, elastic reaction product of one molar proportion of an aromatic compound having the general formula R—C$_6$H$_4$—R', where R and R' each represent hydrogen or a saturated aliphatic hydrocarbon radical containing more than one carbon atom, with about one to three molar proportions of ethylene chloride.

5. An article of manufacture comprising a mixture containing an olefin polysulphide plastic and a plastic, elastic reaction product of an aromatic compound having the general formula R—C$_6$H$_4$—R', where R and R' each represent hydrogen or a saturated aliphatic hydrocarbon radical containing more than one carbon atom, with about one to three molar proportions of ethylene chloride, said mixed composition being cured to a state resembling vulcanized rubber.

6. An article of manufacture comprising a mixture containing a major proportion of an olefin polysulphide plastic and a minor proportion of a plastic, elastic reaction product of an aromatic compound having the general formula R—C$_6$H$_4$—R', where R and R' each represent hydrogen or a saturated aliphatic hydrocarbon radical containing more than one carbon atom, with about one to three molar proportions of ethylene chlorde, said mixed composition being cured to a state resembling vulcanized rubber.

7. An article of manufacture comprising a mixture containing an olefin polysulphide plastic and up to about 60 parts per 100 parts of said olefin polysulphide plastic by weight of a plastic, elastic reaction product of an aromatic compound having the general formula R—C$_6$H$_4$—R', where R and R' each represent hydrogen or a saturated aliphatic hydrocarbon radical containing more than one carbon atom, with about one to three molar proportions of ethylene chloride, said mixed composition being cured to a state resembling vulcanized rubber.

8. An article of manufacture comprising a mixture containing an olefin polysulphide plastic and about 5 to 20 parts per 100 parts of said olefin polysulphide plastic by weight of a plastic, elastic reaction product of an aromatic compound having the general formula R—C$_6$H$_4$—R', where R and R' each represent hydrogen or a saturated aliphatic hydrocarbon radical containing more than one carbon atom, with about one to three molar proportions of ethylene chloride, said mixed composition being cured to a state resembling vulcanized rubber.

ARTHUR E. BROOKS.